(12) United States Patent
Wood

(10) Patent No.: US 9,556,838 B2
(45) Date of Patent: Jan. 31, 2017

(54) AIRCRAFT FUEL SUPPLY SYSTEMS

(71) Applicant: EATON LIMITED, Titchefield, Hampshire (GB)

(72) Inventor: John Henry Wood, Truro (GB)

(73) Assignee: EATON LIMITED, Titchfield, Hampshire (GB)

( * ) Notice: Subject to any disclaimer, the term of this patent is extended or adjusted under 35 U.S.C. 154(b) by 95 days.

(21) Appl. No.: 14/395,498

(22) PCT Filed: Apr. 18, 2013

(86) PCT No.: PCT/IB2013/002579
§ 371 (c)(1),
(2) Date: Oct. 20, 2014

(87) PCT Pub. No.: WO2014/027250
PCT Pub. Date: Feb. 20, 2014

(65) Prior Publication Data
US 2015/0114477 A1 Apr. 30, 2015

(30) Foreign Application Priority Data

Apr. 18, 2012 (GB) .................................. 1206831.8

(51) Int. Cl.
*F02M 37/20* (2006.01)
*F02C 7/236* (2006.01)
(Continued)

(52) U.S. Cl.
CPC .............. *F02M 37/20* (2013.01); *B64D 37/22* (2013.01); *B64D 37/32* (2013.01); *F02C 7/236* (2013.01);
(Continued)

(58) Field of Classification Search
None
See application file for complete search history.

(56) References Cited

U.S. PATENT DOCUMENTS

| 5,490,387 | A | * | 2/1996 | Bisson | ................... | B64D 37/20 |
|---|---|---|---|---|---|---|
| | | | | | | 137/586 |
| 7,628,057 | B1 | * | 12/2009 | Solomon | ................... | G01N 7/14 |
| | | | | | | 73/64.45 |

(Continued)

FOREIGN PATENT DOCUMENTS

WO   WO 2009139801 A2   11/2009

*Primary Examiner* — Medhat Badawi
*Assistant Examiner* — Vicente Rodriguez
(74) *Attorney, Agent, or Firm* — Leydig, Voit & Mayer, Ltd.

(57) ABSTRACT

A fuel supply system for an aircraft is provided for delivering in use fuel from a fuel tank to an aircraft powerplant. The in use fuel flows along a fuel flow passage from the fuel tank to the powerplant. A downstream pump is associated with the powerplant and configured to draw fluid along the fuel flow path so as to supply it to the powerplant in use. An upstream pump is disposed in or associated with the fuel tank and operable to pump fluid along the fuel flow passage. A pressure sensor is configured to monitor a pressure at an inlet to the downstream pump. A fuel system controller is responsive to the pressure sensor and configured to control the upstream pump so as to maintain the pressure at the inlet to the downstream pump at or above a predetermined threshold pressure.

12 Claims, 1 Drawing Sheet

(51) Int. Cl.
*F02C 9/28* (2006.01)
*B64D 37/22* (2006.01)
*B64D 37/32* (2006.01)
*F02M 37/18* (2006.01)
*B64D 27/04* (2006.01)
*F02M 37/08* (2006.01)

(52) U.S. Cl.
CPC ............... *F02C 9/28* (2013.01); *F02M 37/18* (2013.01); *B64D 27/04* (2013.01); *F02M 2037/085* (2013.01); *Y10T 137/0379* (2015.04)

(56) References Cited

U.S. PATENT DOCUMENTS

| | | | |
|---|---|---|---|
| 8,944,767 B2* | 2/2015 | Stoicescu | F04D 29/2277 |
| | | | 416/175 |
| 2005/0217236 A1 | 10/2005 | Wernberg et al. | |
| 2011/0206539 A1* | 8/2011 | Mori | F04B 49/06 |
| | | | 417/42 |
| 2012/0111417 A1* | 5/2012 | Smith | B64D 37/04 |
| | | | 137/14 |
| 2012/0156056 A1* | 6/2012 | Akita | F04B 49/065 |
| | | | 417/42 |
| 2012/0219449 A1* | 8/2012 | Ni | F04C 2/18 |
| | | | 418/206.7 |

* cited by examiner

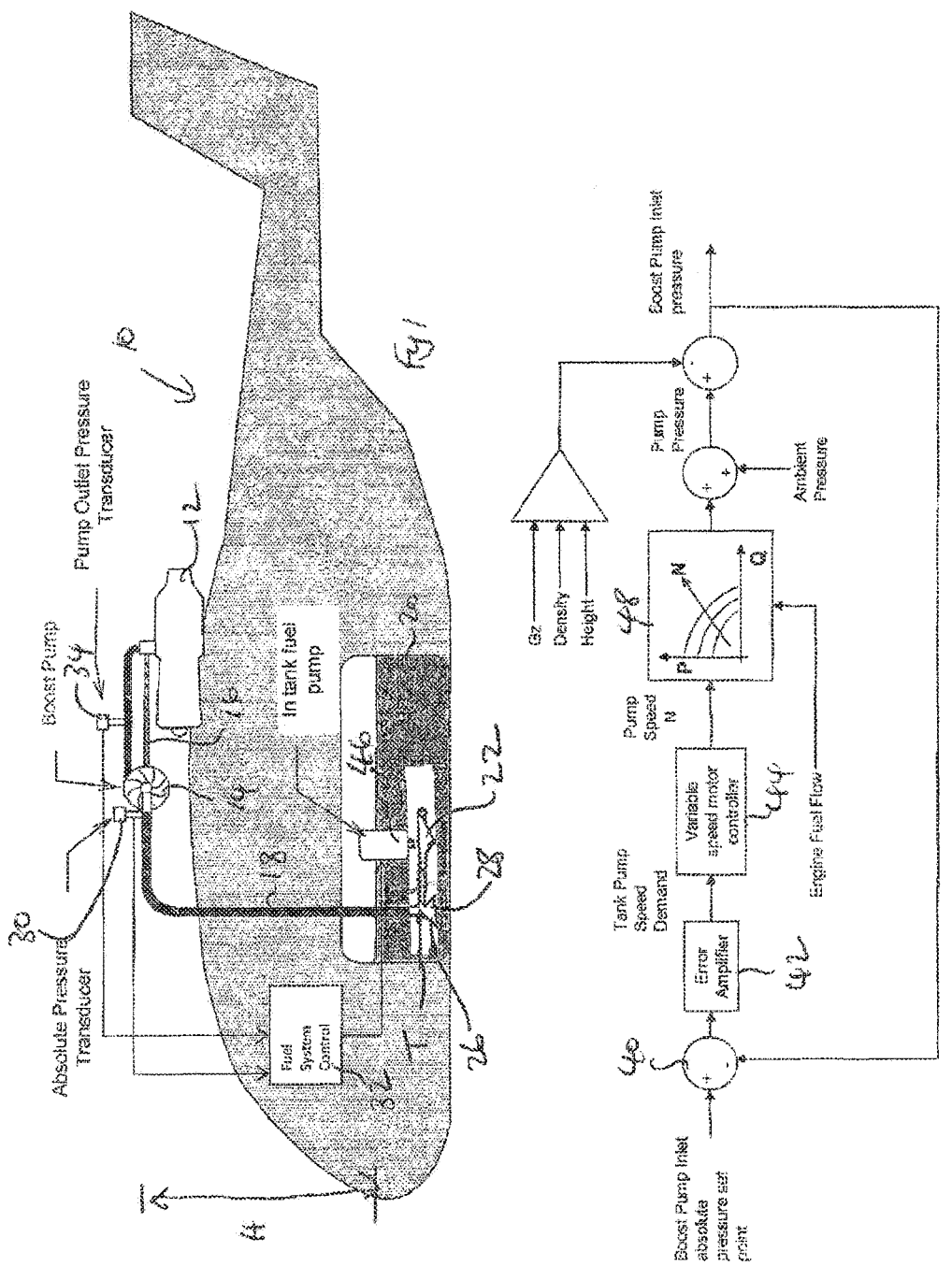

AIRCRAFT FUEL SUPPLY SYSTEMS

This invention was made with government support under contract number N00019-06-C-0081 awarded by the Department of the Navy—Naval Air Systems Command. The government has certain rights in the invention.

CROSS-REFERENCE TO PRIOR APPLICATIONS

This application is a U.S. National Stage Application under 35 U.S.C. §371 of International Application No. PCT/IB2013/002579 filed on Apr. 18, 2013, and claims benefit to British Patent Application No. GB 1206831.8 filed on Apr. 18, 2012. The International Application was published in English on Feb. 20, 2014 as WO 2014/027250 A2 under PCT Article 21(2).

FIELD

This invention relates to aircraft fuel supply systems and to associated methods for supplying fuel from the fuel tank to the powerplant of an aircraft, and in particular, but not e xclusively, to helicopter fuel supply systems.

BACKGROUND

In a typical helicopter layout, a fuel tank is located in a lower portion of the helicopter and the main powerplant driving the helicopter rotor is located in an upper portion of the helicopter. Fuel is drawn through a fuel pipe from the fuel tank by means of a suction pump located adjacent the main powerplant. This suction configuration is preferred as it mitigates fire hazard in the event of damage to the fuel pipe between the tank and the pump, because the pressure differential means that air is drawn into the fuel pipe rather than fuel spraying out of the pipe which would be the case if the pump were located in the fuel tank and which would constitute a potential hazard. However, as helicopters get larger the fuel head between the fuel pump and the tank increases, meaning that the suction required increases. Also, particularly in military helicopters, as the manoeuvres that the helicopter can undertake become more extreme, there is a risk that a combination of the head of fuel between the pump and the tank, and the high acceleration experienced during extreme manoeuvres mean that the absolute pressure at the inlet to the suction pump may approach or fall below the true vapour pressure of the fuel. This can cause fuel vapour to be evolved, and dissolved air to come out of solution, and if the proportion of gas and/or vapour to liquid fuel at the inlet of the pump exceeds the pump capability, the fuel flow to the powerplant is likely to be interrupted or significantly restricted, thereby resulting in loss of engine power or an engine failure.

SUMMARY

In an embodiment, the present invention provides a fuel supply system for an aircraft for delivering in use fuel from a fuel tank to an aircraft powerplant. A fuel flow passage connects the fuel tank and the powerplant such that the in use fuel flows along the fuel flow passage from the fuel tank to the powerplant. The fuel flow passage has a downstream end adjacent the powerplant and an upstream end adjacent the fuel tank. A downstream pump is associated with the powerplant and configured to draw fluid along the fuel flow path so as to supply it to the powerplant in use. An upstream pump is disposed in or associated with the fuel tank and operable to pump fluid along the fuel flow passage. A pressure sensor is configured to monitor a pressure at an inlet to the downstream pump. A fuel system controller is responsive to the pressure sensor and configured to control the upstream pump so as to maintain the pressure at the inlet to the downstream pump at or above a predetermined threshold pressure.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 is a schematic view of a helicopter fuel supply system in accordance with an embodiment of invention, and FIG. 2 is a block diagram illustrating a control loop for use in the system of FIG. 1.

DETAILED DESCRIPTION

In an embodiment, the present invention provides a fuel supply system for an aircraft which maintains the survivability benefits of the suction feed system, but which maintains sufficient pressure at the inlet to the powerplant to at least reduce the possibility of formation of excessive air and/or vapour that could affect performance of the fuel pump. This is based on the realisation that the pressure at the inlet to the downstream pump is an absolute pressure that can be less than the surrounding atmospheric pressure and that a positive differential pressure between the fuel pressure and the atmosphere outside the pipe is not required in most, if not all, instances.

Accordingly, in one embodiment, the invention provides a fuel supply system for an aircraft for delivering in use fuel from a fuel tank to an aircraft powerplant, said fuel supply system comprising: a fuel flow passage along which in use fuel may flow from said tank to said powerplant, the fuel flow passage having a downstream end adjacent the powerplant and an upstream end adjacent the fuel tank; a downstream pump associated with said powerplant for drawing fluid along said flow path to supply it to said powerplant in use; an upstream pump disposed in or associated with said fuel tank and operable to pump fluid along said flow passage; a pressure sensor for monitoring the inlet pressure to said downstream pump; and a fuel system controller responsive to said pressure sensor to control said upstream pump to maintain the pressure at the inlet to said downstream pump at or above a predetermined threshold pressure.

Although primarily designed with helicopters in mind, it will be understood that the control system may also be beneficial on board other aircraft, for example, military transport aircraft.

The upstream pump may be a feed pump that is operated to pressurize the fuel supply to the downstream pump to ensure that the inlet pressure to the downstream suction pump is sufficient for proper operation thereof.

In some embodiments, the absolute pressure at the inlet of the upstream pump is detected and used in a control loop which controls operation of the upstream pump. For example, in one scheme the fuel system controller controls the upstream pump to maintain the absolute pressure at the inlet to said downstream pump at a preset margin above a true vapour pressure value for the fuel. The true vapour pressure value may be a fixed value representative of a value in the range of true vapour pressures for the fuel throughout the anticipated operating envelope of the aircraft. Alternatively, a variable true vapour pressure value may be determined on the basis of one or more parameters such as e.g. fuel temperature, and fuel type. Thus the system may include data that provides true vapour pressure values for different combinations of fuel temperature and fuel type, which is then used to determine an appropriate true vapour pressure value.

In other embodiments an adaptive system may be implemented which instead of controlling the upstream pump on the basis of a direct measurement of the absolute pressure at the inlet of the downstream pump, measures the pressure at the outlet of the downstream pump (or the pressure rise across the downstream pump) and the fuel system controller may increase or decrease the pressurization caused by the upstream pump in response to decreases or increases in said measured pressure. In this way, the fuel supply system may operate self-adaptively to ensure that the pressure at the inlet of the downstream pump is sufficient for proper operation of the downstream pump.

Accordingly, in another embodiment, the invention provides a fuel supply system for an aircraft for delivering in use fuel from a fuel tank to an aircraft powerplant, said fuel supply system comprising: a fuel flow passage along which in use fuel may flow from said tank to said powerplant, the fuel flow passage having a downstream end adjacent the powerplant and an upstream end adjacent the fuel tank; a downstream pump associated with said powerplant for drawing fluid along said flow path to supply it to said powerplant in use; an upstream pump disposed in or associated with said fuel tank and operable to pump fluid along said flow passage; a pressure sensor for monitoring a pressure adjacent to said downstream pump; and a fuel system controller responsive to said pressure sensor to control said upstream pump in response to variations in the pressure measured adjacent said downstream pump.

This pressure sensor may measure the pressure downstream of the downstream pump or it may measure the pressure rise across the pump.

Preferably the upstream pump may be controlled to pressurize the flow to the downstream pump by a variable extent. For example, said upstream pump may include a variable speed motor drive under the control of a variable speed motor controller, and the fuel system controller may control the variable speed motor controller so that the upstream pump delivers sufficient pressure to maintain the pressure at the inlet to said downstream pump at or above said predetermined threshold.

Although the upstream pump may be located intermediate the fuel tank and the downstream pump, it is preferred for the upstream pump to be located in said fuel tank.

Although electrical or other drives are possible, it is preferred for downstream pump to be driven by said powerplant.

In many typical helicopter arrangements, the fuel tank is located in a lower portion of the helicopter and the powerplant is located in an upper portion thereof, although the system may be used in other configurations where high G accelerations cause local reduction in fuel pressure.

A pump outlet pressure sensor may be provided at the outlet of said downstream pump, and the fuel system controller may be additionally responsive to said pump outlet pressure sensor to adjust said threshold pressure. The pump outlet pressure sensor typically detects the gauge pressure of the pump outlet. This may be used, for example, to compensate for cavitation or other factors that reduce the pressure head across the downstream pump.

In another embodiment, the invention provides a method of supplying fuel along a flow path from a fuel tank to a main powerplant of an aircraft, which comprises: providing a downstream pump associated with said powerplant and operating said downstream pump to deliver fuel to said powerplant; providing an upstream pump associated with said fuel tank; monitoring the absolute pressure at the inlet to said downstream pump; and operating said upstream pump to pressurize the flow to the downstream pump if said detected absolute pressure falls below a set threshold.

Referring initially to FIG. 1, a helicopter 10 is shown which includes a powerplant 12 to drive the rotor. The powerplant 12 is mounted in an upper portion of the helicopter fuselage and receives fuel from a main (downstream) fuel pump 14 which is, in this embodiment, driven by a power take off shaft 16 from the powerplant 12. Fuel is supplied to the main fuel pump 14 by means of a fuel pipe 18 which extends from a fuel tank 20 in a lower portion of the helicopter fuselage. It will be noted that there is a significant head 'H' separating the pump from the fuel tank. With increases in helicopter size, this head also increases which means that the amount of suction required to overcome the head and pass fluid to the engine increases. An upstream (feed) pump 22 is disposed in the fuel tank and connected to the fuel supply pipe at a T-junction 24. The other branch of the T passes to a suction inlet 26 that includes a non-return valve 28 through which fuel is drawn if the flow out of the upstream pump is nil or low, but which closes when the upstream pump is delivering at higher rates.

The upstream pump 22 is operable to pressurise the flow in the fuel pipe to the downstream pump and to compensate for a drop in the pressure in the fuel pipe 18 when the helicopter undergoes extreme manoeuvres that result in high G acceleration that add significantly to the pressure drop due to the head. An absolute pressure transducer 30 is provided at the inlet to the downstream pump and monitors the absolute pressure of the fuel in the line at this point. A fuel system controller 32 monitors the absolute pressure measured and controls the rotational speed of the upstream pump 22 to pressurise the fuel supplied in the fuel pipe 18 sufficiently so that the absolute pressure at the inlet to the downstream pump 14 does not drop below a particular threshold. Thus, if the detected absolute pressure drops below the threshold, the fuel system controller 32 causes the pump 22 to rotate at a sufficient speed to generate sufficient pressure to maintain the appropriate pressure. The threshold pressure is set according to a calculated or otherwise attributed vapour pressure value of the fuel. This may be taken to be a fixed standard value that does not vary with ambient and operating conditions, or the true vapour pressure value may be adjusted for variation of true vapour pressure with other parameters such as fuel type and fuel temperature etc. The controller may typically operate to cause the upstream pump to operate to ensure that the absolute pressure in the supply to the downstream pump never drops below the value corresponding to a true vapour pressure plus a margin of e.g. 5 psia.

Our calculations indicate that, for typical fuels, pressurising to a value of approximately true vapour pressure plus 5 psia will still result in a pressure which is lower than ambient at altitudes of up to 22,000 feet. This means that, if the fuel line is fractured or punctured at a location between the upstream and downstream pumps, the pressure in the fuel line at most, if not all, locations will be below ambient and so the aircraft will not be at hazard from leaking fuel. In certain extremes of the altitude and manoeuvre envelope there may be transient excursions where the local internal pressure exceeds the ambient pressure but this is only likely to be for very short periods, and so any fuel leak will only last for the transient period, thus limiting the duration of any hazard; also other measures such as self healing coatings may help to minimise fuel leakage in these circumstances.

It will be appreciated that, in other flight conditions, e.g. in level flight at sea level, the variable speed electric motor driven pump would not be required to deliver pressure. In this condition, the feed pump would be run in a tick over condition with speed feedback to verify the system availability or it may be switched off altogether, with fuel then being drawn through the non-return valve 28. But as soon as the engine interface pressure drops during manoeuvres owing to the increase in the effective head from the tank to the engine, the pump is accelerated by the controller to return the absolute pressure to the required value.

A further pressure sensor 34 may be provided at the delivery side of the downstream pump to monitor the fuel pressure at that point. For example, if transient cavitation of the main pump should occur, this would lead to a fall in pressure at the delivery side of the pump. This may be compensated by the engine controller for example by increasing the value of the absolute pressure sent to the controller or increasing the value of the margin to more than 5 psia. In this way, the upstream pump is caused to incrementally increase the amount of pressurisation so that the pressure at the inlet to the downstream pump is increased and thereby reducing the likelihood of cavitation.

Referring now to FIG. 2, this illustrates a control loop that may be implemented by the engine controller. The absolute pressure threshold (that is calculated on the basis of the true vapour pressure of the fuel being used with a margin of typically 5 psia) is compared at 40 with the boost inlet pressure measurement detected by the absolute pressure transducer 30. This generates an error which is then amplified at 42 and used as an input to a variable speed motor controller 44 that controls the speed of an electric motor 46 that drives the upstream pump 22 in the fuel tank 20. The pump speed provides a particular pressure/mass flow rate depending on the mass flow to the engine as indicated at 48. The ambient pressure has an additive effect with the acceleration (primarily in the vertical direction (GZ)), fuel density, and the altitude of the aircraft all having an effect on the pressure at the inlet of the downstream pump. The control loop illustrated in FIG. 2 therefore ensures that the appropriate boost pump inlet pressure point is maintained throughout the full range of operating conditions experienced by the helicopter.

The fuel system controller 32 may operate the fuel system in a number of different operating modes. For priming, the upstream fuel pump in the fuel tank may be operated open loop at its maximum operating pressure, after maintenance or on powerplant start to fill the feed lines that have been drained of fuel, to compress any air within the system and deliver solid fuel to the downstream pump. The priming operation may also be used in flight as a relight. In a pre-flight test mode, a pressure demand sequence may be input to verify the system capability. For a continuous 'built-in test' (BIT) the level of the pressure error determined at 40 can be monitored. In a combat mode, certain modes may be disabled such as adaptive control and auto-relight. In a failure mode, a puncture of the fuel pipe 18 will result in the admission of air, and the corresponding increase in the pressure detected by the absolute pressure detector 30 could be used to flag a puncture event and consequently to cause the system to shut down. However a feature of this embodiment is that an undetected leak is not hazardous and an active control logic to shut the system is not required.

As noted above, for adaptive control, a pressure transducer 34 may be used to detect transient cavitation of the downstream pump (14) and with the control loop being incrementally modified to cause the pressure at the inlet to the downstream pump 14 to be increased by increasing the pressurization applied by the upstream pump 22.

Thus, instead of controlling the speed of the upstream pump on the basis of the absolute pressure detection, the fuel system controller may detect just the output pressure of the downstream pump and control the upstream pump so that this output pressure is maintained. The control system of FIG. 2 may be adapted so that the detected output pressure is used as a set point for the control loop.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A fuel supply system for an aircraft for delivering in use fuel from a fuel tank to an aircraft powerplant, the fuel supply system comprising:
   a fuel flow passage connecting the fuel tank and the aircraft powerplant and being configured to allow in use fuel to flow from the fuel tank to the powerplant, the fuel flow passage having a downstream end adjacent the powerplant and an upstream end adjacent the fuel tank,
   a downstream pump associated with the aircraft powerplant and configured to draw fluid along the fuel flow path so as to supply the fluid to the powerplant in use,
   an upstream pump disposed in or associated with the fuel tank and operable to pump fluid along the fuel flow passage, a pump inlet pressure sensor configured to monitor a pressure at an inlet to the downstream pump, a pump outlet pressure sensor disposed at an outlet of the downstream pump and configured to monitor a pressure at an outlet of the downstream pump, and a fuel system controller configured to, in response to the pressure at the inlet to the downstream pump monitored by the pump inlet pressure sensor, control the upstream pump so as to maintain the pressure at the inlet to the downstream pump at or above a threshold pressure, and additionally configured to, in response to the pressure at the outlet of the downstream pump monitored by the pump outlet pressure sensor, adjust the threshold pressure.

2. The fuel supply system according to claim 1, wherein the fuel system controller is configured to control the upstream pump so as to maintain an absolute pressure at the inlet to the downstream pump at a preset margin above a true vapour pressure value for the fuel.

3. The fuel supply system according to claim 2, wherein the true vapour pressure value is a preset value.

4. The fuel supply system according to claim 2, wherein the true vapour pressure value is a variable true vapour pressure value based on one or more parameters including at least one of fuel temperature and fuel type.

5. The fuel supply system according claim 1, wherein the downstream pump includes a variable speed motor under control of a variable speed motor controller, and wherein the fuel system controller is configured to control the variable speed motor controller so that the upstream pump delivers sufficient pressure to maintain the pressure at the inlet to the downstream pump at or above the threshold pressure.

6. The fuel supply system according to claim 1, wherein the upstream pump is located in the fuel tank.

7. The fuel supply system according to claim 1, wherein the downstream pump is driven by the powerplant.

8. The fuel supply system according to claim 1, wherein the aircraft is a helicopter, and wherein the fuel tank is located in a lower portion of the helicopter and the powerplant is located in an upper portion of the helicopter.

9. The fuel supply system according to claim 1, wherein the pump outlet pressure sensor detects a gauge pressure at the outlet of the downstream pump.

10. A fuel supply system for an aircraft for delivering in use fuel from a fuel tank to an aircraft powerplant, the fuel supply system comprising:

a fuel flow passage connecting the fuel tank and the aircraft powerplant and being configured to allow in use fuel to flow from the fuel tank to the powerplant, the fuel flow passage having a downstream end adjacent the powerplant and an upstream end adjacent the fuel tank, a downstream pump associated with the aircraft powerplant and configured to draw fluid along the fuel flow path so as to supply the fluid to the powerplant in use, an upstream pump disposed in or associated with the fuel tank and operable to pump fluid along the fuel flow passage, an upstream pressure sensor configured to monitor a pressure adjacent the downstream pump, a downstream pressure sensor disposed at an outlet of the downstream pump and configured to monitor a pressure at an outlet of the downstream pump, and a fuel system controller configured to control the upstream pump in response to variations in the pressure measured adjacent the downstream pump by the upstream pressure sensor and in response to variations in the pressure measured at the outlet of the downstream pump by the downstream pressure sensor.

11. A method of supplying fuel along a flow path from a fuel tank to a main powerplant of an aircraft, the method comprising:

providing a downstream pump associated with the powerplant and operating the downstream pump so as to deliver the fuel to the powerplant, providing an upstream pump associated with the fuel tank, monitoring, via a pump inlet pressure sensor, an absolute pressure at an inlet to the downstream pump, monitoring, via a pump outlet pressure sensor, a pressure at an outlet of the downstream pump, and operating the upstream pump so as to pressurize a flow to the downstream pump based on the monitored absolute pressure falling below a threshold, wherein the threshold is adjusted in response to the pressure at the outlet of the downstream pump monitored by the pump outlet pressure sensor.

12. A method of supplying fuel along a flow path from a fuel tank to a main powerplant of an aircraft, the method comprising:

providing a downstream pump associated with the powerplant and operating the downstream pump so as to deliver the fuel to the powerplant, providing an upstream pump associated with the fuel tank, monitoring, via an upstream pressure sensor, a pressure adjacent the downstream pump, monitoring, via a downstream pressure sensor, a pressure at aan outlet of the downstream pump, and operating the upstream pump so as to pressurize a flow to the downstream pump in accordance with variations in the pressure measured adjacent the downstream pump by the upstream pressure sensor and in response to variations in the pressure measured at the outlet of the downstream pump by the downstream pressure sensor.

* * * * *